US006805995B2

United States Patent
Yoshinaka et al.

(10) Patent No.: US 6,805,995 B2
(45) Date of Patent: Oct. 19, 2004

(54) SEALED CYLINDRICAL NICKEL-METAL HYDRIDE STORAGE BATTERY

(75) Inventors: Takeshi Yoshinaka, Nara (JP); Shogo Yamamoto, Hirakata (JP); Toru Inagaki, Moriguchi (JP); Yasushi Nakamura, Kamakura (JP); Futoshi Tanigawa, Neyagawa (JP); Hideo Kaiya, Moriguchi (JP); Hiroki Takeshima, Fujisawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 584 days.

(21) Appl. No.: 09/828,732

(22) Filed: Apr. 9, 2001

(65) Prior Publication Data

US 2002/0009631 A1 Jan. 24, 2002

Related U.S. Application Data

(63) Continuation of application No. PCT/JP00/01693, filed on Mar. 17, 2000.

(30) Foreign Application Priority Data

Sep. 16, 1999 (JP) .......................................... 11-262743

(51) Int. Cl.$^7$ ............................................. H01M 10/34
(52) U.S. Cl. ........................ 429/94; 429/164; 429/163; 429/218.2
(58) Field of Search ........................ 429/94, 163, 164, 429/218.2

(56) References Cited

U.S. PATENT DOCUMENTS

| 4,032,695 A | * | 6/1977 | Coibion ........................ 429/94 |
| 4,522,897 A | * | 6/1985 | Walsh ........................ 429/119 |
| 4,637,967 A | * | 1/1987 | Keem et al. ................ 429/101 |
| 5,677,080 A | * | 10/1997 | Chen ........................ 429/167 |
| 5,712,056 A | | 1/1998 | Matsumasa et al. |

FOREIGN PATENT DOCUMENTS

| JP | 36-23749 Y1 | 9/1961 | |
| JP | 37-22956 Y1 | 8/1962 | |
| JP | 52-31334 A | 3/1977 | |
| JP | 58-24967 A | 2/1983 | |
| JP | 06215796 A | * 8/1994 | .......... H01M/10/28 |

* cited by examiner

Primary Examiner—Carol Chaney
(74) Attorney, Agent, or Firm—Akin, Gump, Strauss, Hauer & Feld, L.L.P.

(57) ABSTRACT

The present invention provides a high-capacity sealed nickel-metal hydride storage battery superior in high-current discharge, without extending the injection time of an electrolyte. This battery includes an electrode group, a metal case for accommodating the electrode group, and a seal plate provided with a safety vent, for sealing an opening of the case, and the electrode group has a structure in which, round a non-sintered type cylindrical electrode of one polarity, a non-sintered type hollow cylindrical electrode of the other polarity and a non-sintered type hollow cylindrical electrode of the one polarity are layered alternately in the form of concentric circles with a separator between the electrodes.

6 Claims, 4 Drawing Sheets

SEALED CYLINDRICAL NICKEL-METAL HYDRIDE STORAGE BATTERY

CROSS-REFERENCE TO RELATED APPLICATION

This application is a continuation of International Application No. PCT/JP00/01693 filed Mar. 17, 2000 the disclosure of which is incorporated herein by reference.

BACKGROUND OF THE INVENTION

The present invention relates to an improvement of small-sized, high capacity nickel-metal hydride storage batteries composed of a nickel positive electrode, a hydrogen storage alloy negative electrode, a separator and an alkaline electrolyte.

A nickel-metal hydride storage battery is a secondary battery comprising a positive electrode formed from an active material composed mainly of nickel hydroxide and a negative electrode composed mainly of a hydrogen storage alloy, and has been widely used as a power source of portable equipment. However, an increase in the capacity has been desired for the further spread thereof. Noting the nickel-metal hydride storage batteries of a cylindrical type, at present, an electrode group inserted into a metal case generally has a so-called spiral structure in which a positive electrode plate, a negative electrode plate and a separator for separating these electrode plates from each other are wound in a spiral form. However, the electrode group with this spiral structure has such problems that a large amount of the separator which does not contribute to the battery capacity is present at the beginning of the winding and at the end of the winding, and a useless volume portion is present at the end of the winding because of its non-concentric form.

Regarding the method of constructing the electrode group, in order to solve the above problems, Japanese Laid-Open Utility Model Publication (Jitsukaisho) No. 58-24967 proposes an alkaline storage battery formed by combining a cylindrical sintered-type electrode and a columnar sinteredtype electrode. This makes it possible to easily insert the electrode group into a metal case. However, since the electrodes use a porous sintered nickel substrate with a porosity of about 80% obtained by sintering a nickel powder, the porosity of the substrate can not be increased any more, and thus the filling efficiency of an active material is low and an increase in the capacity is limited.

Then, in order to further increase the capacity there were invented the following nickel-metal hydride storage batteries (Japanese Laid-Open Patent Publication (Tokukaihei) No. 6-215796) employing a so-called pasted type electrode using a metal core made of a foamed metal porous body which has a large porosity and is capable of being filled with a large amount of an active material, or metal fiber, carbon fiber, metal mesh, punching metal, expanded metal, etc. Namely, a battery formed by layering a columnar electrode of one polarity and a hollow cylindrical electrode of the other polarity in the form of, concentric circles with a separator interposed therebetween so that the columnar electrode is located in the center, and a nickel-metal hydride storage battery formed by layering, round a columnar electrode of one polarity, a separator, a hollow cylindrical electrode of the other polarity, a separator and a hollow cylindrical electrode of the one polarity in this order. This makes it possible to achieve a drastic increase in the capacity.

However, there are the following problems in the structure of the electrode group in which, round a columnar electrode of one polarity, a hollow cylindrical electrode of the other polarity is layered in the form of concentric circles with a separator interposed therebetween and in the structure of the electrode group in which, round a cylindrical electrode of one polarity, a separator, a hollow cylindrical electrode of the other polarity, a separator and a hollow cylindrical electrode of the one polarity are layered in this order.

The first problem is a characteristic problem that an actual battery capacity at a specific high-current discharge is much lower than that of batteries with a conventional structure because the area of the mutually facing electrodes is small. The second problem is a productive problem that, in a state in which the electrode group is being inserted in the metal case, it takes a long time to inject an electrolyte.

BRIEF SUMMARY OF THE INVENTION

The present invention ensures a certain area or more area of facing positive and negative electrodes by an electrode group structure in which electrodes of different polarities are repeatedly layered in the form of concentric circles with a separator interposed therebetween, and thereby solving the above-mentioned first problem.

The present invention forms an electrode serving as the center of an electrode group in a hollow cylindrical shape to facilitate the injection of an electrolyte into the hollow section, or layered electrodes in many layers to facilitate the injection of an electrolyte into a separator between the electrodes, and thereby solving the second problem.

The present invention provides a sealed cylindrical nickel-metal hydride storage battery comprising: an electrode group; a metal case for accommodating the electrode group; and a seal plate provided with a safety vent, for sealing an opening of the metal case, the electrode group being composed of at least one non-sintered type hollow cylindrical electrode of one polarity, at least one non-sintered type hollow cylindrical electrode of the other polarity and a separator for separating these electrodes from each other, wherein the electrodes are arranged alternately in the form of concentric circles with a separator interposed there between so that the electrode of the one polarity is located in the center.

Further, the present invention provides a sealed cylindrical nickel-metal hydride storage battery comprising: an electrode group; a metal case for accommodating the electrode group; and a seal plate provided with a safety vent, for sealing an opening of the metal case, the electrode group being composed of a non-sintered type columnar electrode of one polarity, at least one nonsintered type hollow cylindrical electrode of the one polarity, at least two non-sintered type hollow cylindrical electrodes of the other polarity and a separator for separating these electrodes from each other, wherein the cylindrical electrode of the other polarity and the cylindrical electrode of the one polarity are arranged alternately in the form of concentric circles with the separator interposed therebetween so that the columnar electrode of the one polarity is located in the center.

BRIEF DESCRIPTION OF THE SEVERAL VIEWS OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown.

In the drawings.

DETAILED DESCRIPTION OF THE INVENTION

Figure 1:
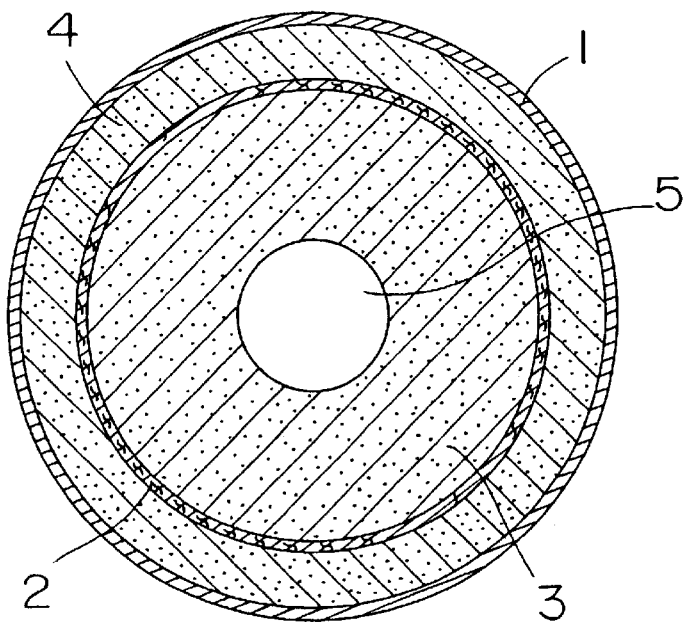
FIG. 1 is a transverse cross section of a battery according to an example of the present invention.

The present invention is directed to a sealed cylindrical nickel-metal hydride storage battery comprising: an electrode group; a metal case for accommodating the electrode group; and a seal plate provided with a safety vent, for sealing an opening of the metal case, and characterized in that the electrode group is composed of at least one non-sintered type hollow cylindrical electrode of one polarity, at least one non-sintered type hollow cylindrical electrode of the other polarity and a separator for separating these electrodes from each other and that the electrodes are arranged alternately in the form of concentric circles with the separator interposed therebetween so that the electrode of the one polarity is located in the center.

In another aspect, the present invention is characterized in that the electrode group is composed of a non-sintered type columnar electrode of one polarity, at least one non-sintered type hollow cylindrical electrode of the one polarity, at least two non-sintered type hollow cylindrical electrodes of the other polarity and a separator for separating these electrodes from each other and that the cylindrical electrode of the other polarity and the cylindrical electrode of the one polarity are arranged alternately in the form of concentric circles with the separator interposed therebetween so that the columnar electrode of the one polarity is located in the center.

As described above, in the electrode group of the present invention, since the electrodes of different polarities are repeatedly layered in the form of concentric circles with the separator interposed therebetween, it is possible to ensure a certain area or more area of facing positive and negative electrodes and provide a battery having a sufficient capacity at light-current discharge.

In the electrode group of the present invention, since the electrodes are layered in many layers, it is possible to easily inject an electrolyte into the separator between the electrodes. In particular, when the electrode serving as the center of the electrode group has a hollow cylindrical shape, it is possible to easily, inject an electrolyte into the hollow section of the electrode.

In a preferred mode of the present invention, the electrodes are constructed in a configuration comprising vertically split bodies or a slit in a vertical direction, one piece of continuing separator separates the electrode of one polarity from the electrode of the other polarity, and the separator which covers the outer side of the inner electrode only one turn goes through the clearance between the split bodies or the slit of the outer electrode and is connected to its portion covering the outer side of the outer electrode.

In constructing an electrode group comprising hollow cylindrical electrodes of different polarities which are layered alternately with a separator interposed therebetween, when inserting into the hollow section of the electrode of one polarity the electrode of the other polarity with the separator interposed therebetween, such a problem that the separator is caught in the electrode may occur. According to the above-described preferred embodiment, it is possible to prevent the separator from being caught.

A preferred method for constructing such an electrode group comprises the steps of:

(a) preparing electrodes having a configuration comprising vertically split bodies or a slit in a vertical direction, one piece of long separator, and a core;

(b) arranging the electrode of one polarity round the core holding an end of the separator, drawing the separator out of the electrode from a clearance between the split bodies or the slit of the electrode, and winding the separator only one turn on the outer side of this electrode;

(c) arranging the electrode of the other polarity on the outer side of the wound separator, drawing the remaining portion of the separator out of the electrode of the other polarity from a clearance between the split bodies or the slit of this electrode, and winding the separator on the outer side of this electrode;

(d) repeating the step (c) until the number of the remaining electrode is one; and (e) arranging the remaining electrode on the outer side of the outermost turn of the wound separator to provide the electrode group.

The electrodes for use in the present invention are preferably electrodes produced by pressure-molding a powder composed mainly of an active material, or by applying or filling the powder to a two-dimensional or three-dimensional metal core and subjecting it to pressure molding.

It is preferable that part or all of columnar or hollow cylindrical electrodes are split bodies thereof before a battery is constructed, and the split bodies are assembled into a columnar shape or a hollow cylindrical shape so that the electrodes having the same polarity are electrically connected to each other after the battery is constructed.

The split bodies of the columnar or hollow cylindrical electrode may be constructed by vertically split electrode bodies, or electrodes bodies cut in round slices.

The hollow cylindrical electrode may be constructed by an electrode body prepared by bending a sheet-like electrode plate into a cylindrical shape, or an electrode body prepared by winding an electrode plate in a spiral form.

Further, the hollow cylindrical electrode may be constructed by an electrode body prepared by bending two or more pieces of layered sheet-like electrode plates of the same polarity into a cylindrical shape, or an electrode body prepared by winding two or more pieces of layered electrode plates of the same polarity in a spiral form.

In the above described structures of the electrode groups it is preferable that the electrodes of the same polarity are electrically connected to each other with a metal lead or metal piece (current collector.).

As the separator for separating the electrodes of different polarities, it is suitable to use a separator obtained by thermally welding a band-like separator at the time it was wound one turn in a cylindrical shape. With the use of this separator, it is possible to construct an extremely concentric electrode group, thereby further improving the efficiency of inserting the electrode group into a metal case.

In the above, the structure of the electrode group has been mainly illustrated. For the battery case for accommodating the electrode group, the seal plate for sealing the opening of the battery case, etc., it is possible to adopt the known structures, for example, the structures disclosed in U.S. Pat. No. 5,712,056, and this patent is incorporated herein by reference.

The following description will explain the present invention in detail according to examples, but the present invention is not limited to the following examples and can be suitably modified and implemented within the scope of the claimed invention.

EXAMPLE 1

A paste was prepared by adding 10% by weight of cobalt hydroxide powder to nickel hydroxide powder and adding a predetermined amount of pure water thereto. This paste was applied and filled into a foamed metal of a metal core having a three-dimensionally communicating pore, dried, and then subjected to pressure molding so as to form a hollow cylindrical positive electrode 3 with an internal diameter of about 2 mm and an electrode thickness of about 2.05 mm. Meanwhile, a paste composed mainly of a hydrogen storage alloy was applied to a two-dimensional metal core, dried, and then subjected to pressure molding so as to form a hollow clindrical negative electrode 4 with an internal diameter of about 6.34 mm and an electrode thickness of about 0.78 mm. A separator 2 was prepared by winding a band-like separator sheet one turn to form a cylindrical shape and thermally welding its ethyls together. Then, as shown in FIG. 1, the hollow clindrical negative electrode 4 is arranged round the outside of the hollow cylindrical positive electrode 3 with the separator 2 therebetween so as to construct an electrode group. This electrode group is inserted into a metal case 1 of AAAA size and, after injecting an electrolyte, an opening of the case 1 is sealed by a seal plate provided with a safety vent. 5 is a hole constituting a hollow sectin of hte positive electrode 3. The positive electrode and the negative electrode are eletrically connected to the seal plate and the case, respectively, and a gasket is placed between the seal plate and the case to insulate them electrically so as to assemble a battery having a known structure. This battery is denoted as battery A.

EXAMPLE 2

Figure 2:
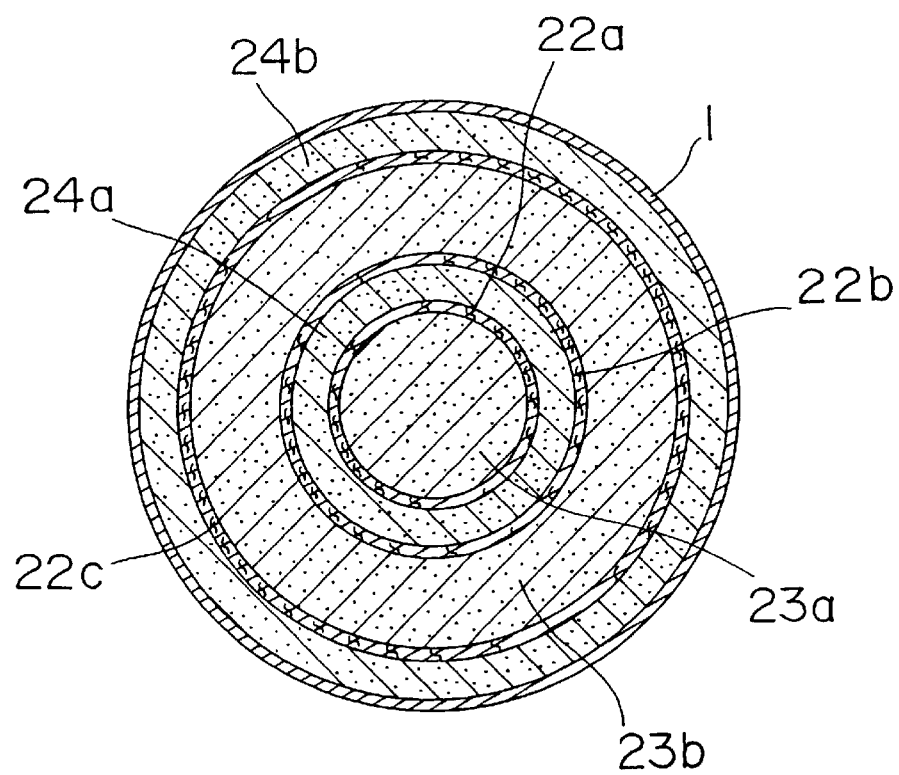
FIG. 2 is a transverse cross section of a battery according to another example of the present invention.

With the same materials and procedure as in Example 1, a columnar positive electrode 23a with a diameter of about 2.54 mm, a hollow cylindrical positive electrode 23b with an internal diameter of about 4.06 mm and an electrode thickness of about 1.27 mm, a hollow cylindrical negative electrode 24a with an internal diameter of about 2.78 mm and an electrode thickness of about 0.52 mm, and a hollow cylindrical negative electrode 24b with an internal diameter of about 6.48 mm and an electrode thickness of about 0.52 mm were formed. The columnar positive electrode 23a and hollow cylindrical positive electrode 23b had a structure having a section which was comoposed only of a metal core and was not filled with an active material at their upper part, while the hollow cylindrical hegative electrodes 24a and 24b had a structure having a section which was composed only of a metal core and was not filled with the active material at their lower part. As shown in FIG. 2, an electrode group was fabricated by arranging the columnar positive electrode 23a, separator 22a, hollow cylindrical negative electrode 24a, separator 22b, hollow cylindrical positive electrode 23b, separator 22c and hollow cylindrical negative electrode 24b in this order in the form of concentric circles so that the columnar positive electrode 23a was located in the center. The metal core sections of the positive electrodes 23a and 23b were electrically connected to each other in the upper part of the electrode group and the metal core sections of the negative electrodes 24a and 24b were electrically connected to each other in the lower part of the electrode group, respectively, by welding using a disk-shaped metal piece. This electrode group was inserted into the metal case 1 of AA.AA size and, after injecting an electrolyte, the opening of the case 1 was sealed by the seal plate electrically connected to the positive electrode so as to assemble a battery B.

EXAMPLE 3

Figure 3:
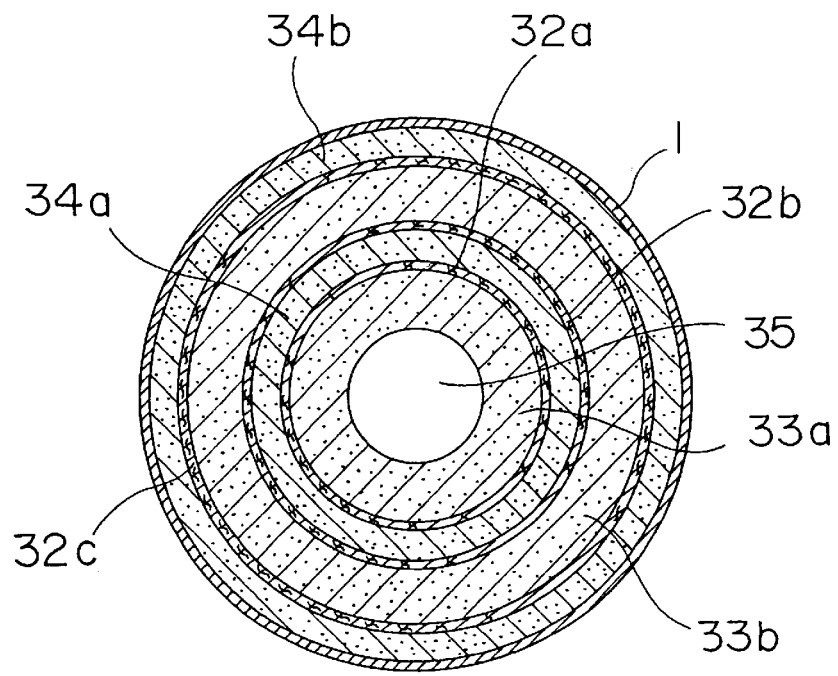
FIG. 3 is a transverse cross section of a battery according to still another example of the present invention.

With the same materials and procedure, as shown in FIG. 3, a hollow cylindrical positive electrode 33a with an internal diameter of about 2 mm and an electrode thickness of about 0.87 mm, a hollow cylindrical positive electrode 33b with an internal diameter of about 5.07 mm and an electrode thickness of about 0.87 mm, a hollow cylindrical negative electrode 34a with an internal diameter of about 3.97 mm and an electrode thickness of about 0.43 mm, and a hollow cylindrical negative electrode 34b with an internal diameter of about 7.03 mm and an electrode thickness of about 0.43 mm were formed. The cylindrical positive electrode 33a and hollow cylindrical positive electrode 33b had a structure having a metal core section which was not filled with the active material at their upper part, while the hollow cylindrical negative electrodes 34a and 34b had a structure having a metal core section which was not filled with the active material at their lower part. An electrode group was fabricated by arranging the hollow cylindrical positive electrode 33a, separator 32a, hollow cylindrical negative electrode 34a, separator 32b, hollow cylindrical positive electrode 33b, separator 32c and hollow cylindrical negative electrode 34b in this order in the form of concentric circles so that the hollow cylindrical positive electrode 33a was located in the center. Then, the metal core sections of the positive electrodes 33a and 33b were electrically connected to each other in the upper part of the electrode group and the metal core sections of the negative electrodes 34a and 34b were electrically connected to each other in the lower part of the electrode group, respectively, by welding using a disk-shaped metal piece. This electrode group was inserted into the metal case 1 of AAAA size and, after injecting an electrolyte, the opening of the case 1 was sealed by the seal plate electrically connected to the positive electrode so as to assemble a battery C.

Comparative Example 1

Figure 6:
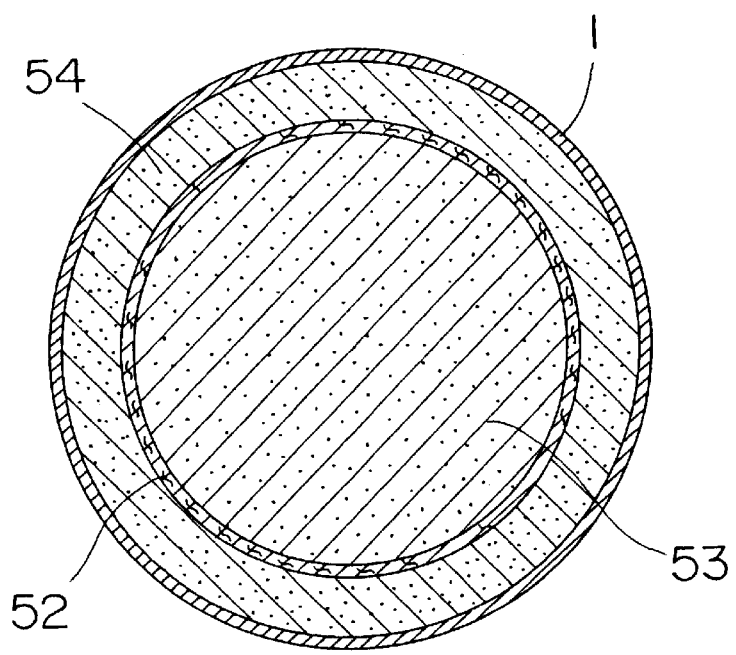
FIG. 6 is a transverse cross section of a battery of a comparative example.

With the same materials and technique as in Example 1, a battery D was fabricated by arranging, as shown in FIG. 6, a columnar positive electrode 53 with a diameter of 5.97 mm, a separator 52 and a hollow cylindrical negative electrode 54 with an internal diameter of 6.21 mm and a thickness of 0.84 mm in this order in the form of concentric circles so that the columnar positive electrode 53 was located in the center.

Comparative Example 2

Figure 7:
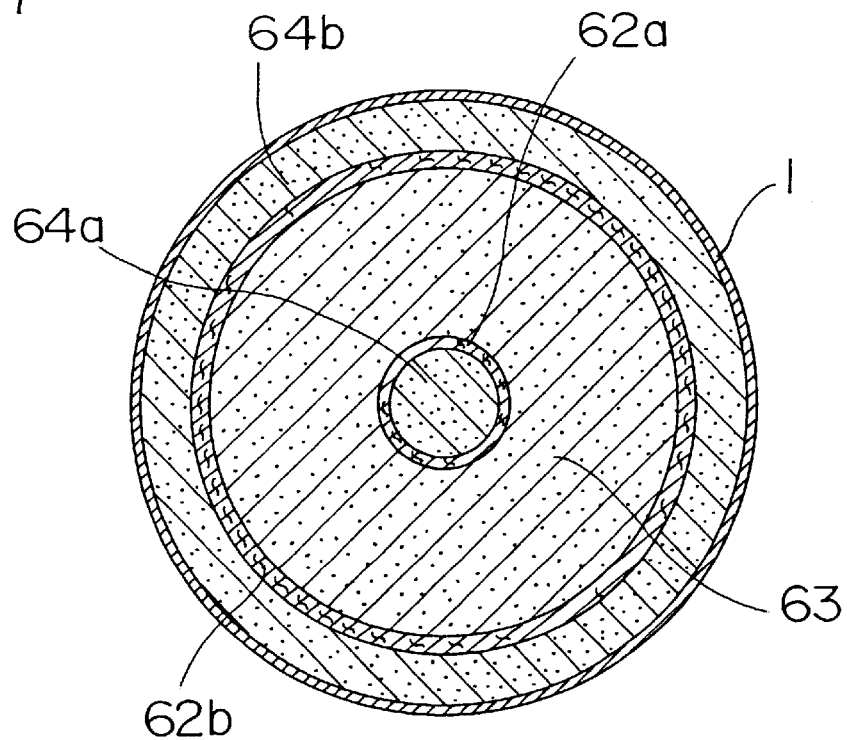
FIG. 7 is a transverse cross section of a battery of another comparative example.

With the same materials and technique as in Example 1, a battery E was fabricated by arranging, as shown in FIG. 7, a columnar negative electrode 64a with a diameter of 1.48 mm, a separator 62a, a hollow cylindrical positive electrode 63 with an internal diameter of 1.72 mm and a thickness of 2.22 mm, a separator 62b, and a hollow cylindrical negative electrode 64b with an internal diameter of 6.56 mm and a thickness of 0.67 mm in this order in the form of concentric circles so that the columnar negative electrode 64a was located in the center.

Comparative Example 3

Figure 8:
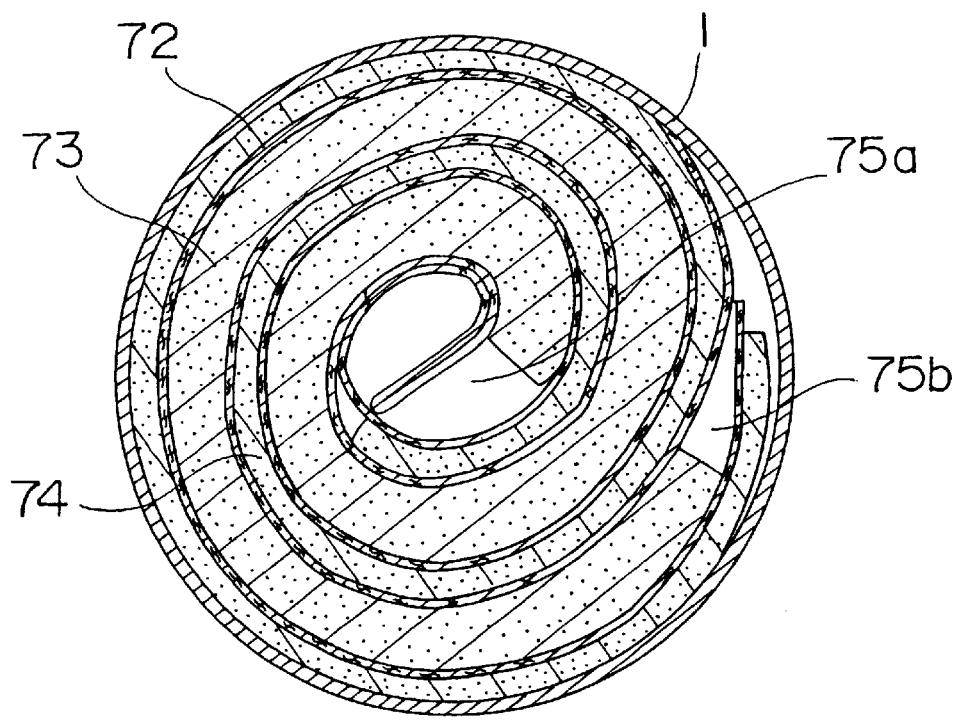
FIG. 8 is a transverse cross section of a battery of still another comparative example.

As shown in FIG. 8, with a conventional general technique, a battery F was fabricated by winding a positive electrode plate 73, a negative electrode plate 74 and a separator 72 for separating these electrode plates from each other in a spiral form. This battery has spaces 75a and 75b at the beginning of winding and the end of the winding of the electrode group.

In the fabrication of the above-described batteries A through F, the theoretical capacity of the negative electrode was made 1.5 times the theoretical capacity of the positive electrode, a non-woven polypropylene fabric to which a hydrophilic property was imparted was used as the separator, and a solution prepared by adding 40 g/l of lithium monohydrate to 7M of KOH aqueous solution was used as the electrolyte.

The theoretical capacity of the positive electrode of the respective batteries fabricated as described above was calculated from a quantity of electricity of 289 mAh/g based on the assumption that a reaction of nickel hydroxide is one electron reaction. The comparisons are shown in Table 1.

Since the above-described batteries had different remaining spatial volumes inside the batteries due to a difference in the inserting efficiency with respect to the metal case, the electrolyte was injected in a constant amount of 95% of the spatial volume inside the electrode group. The injection of the electrolyte was performed under the same conditions using a centrifugal injecting machine that injects the electrolyte with the use of a centrifugal force, and the injection characteristic was evaluated by a time taken for injecting a predetermined amount of the electrolyte.

After injecting the electrolyte into the respective batteries, the batteries were left standing for 24 hours, charged at a current of 0.05 C (20-hour rate) for 30 hours at 20° C., left standing for one hour at 20° C. and then discharged at a current of 0.02 C (50-hour rate) at 20° C. until the battery voltage was lowered to 1 V. After repeating this process twice, the batteries were subjected to aging for one week under the atmosphere of 45° C. to provide batteries for evaluation.

The respective batteries for evaluation were charged at a current of 0.05 C for 30 hours at 20° C., left standing for 1 hour at 20° C., and then discharged at currents of 0.02 C, 0.2 C and 1.0 C at 20° C. until the battery voltage was lowered to 1 V. The battery capacity was calculated from the discharge time in this process.

The results of the above evaluation are shown in Table 1.

TABLE 1

| Battery | Theoretical Capacity (mAh) | Injection Time (second) | Discharge Capacity (mAh) | | |
|---|---|---|---|---|---|
| | | | Discharge at 0.02 CmA | Discharge at 0.02 CmA | Discharge at 1.0 CmA |
| A | 635 | 15 | 565 | 320 | ≈0 |
| B | 640 | 45 | 590 | 525 | 215 |
| C | 580 | 10 | 550 | 530 | 430 |
| D | 680 | 65 | 600 | 330 | ≈0 |
| E | 670 | 50 | 605 | 370 | ≈0 |
| F | 420 | 10 | 405 | 400 | 370 |

As shown in Table 1, the battery A of the present invention is a high-capacity battery that enables the injection of the electrolyte in a much shorter time in comparison with the battery D of the comparative example. Moreover, the battery B of the present invention is a high-capacity battery that has a higher capacity at high-current discharge in comparison with the battery E of the comparative example. The battery C of the present invention is a high-capacity battery that has superior high-current discharge characteristics without extending the time for injecting the electrolyte in comparison with the battery F of the comparative example.

EXAMPLE 4

A paste prepared by adding 10% by weight of cobalt hydroxide powder to nickel hydroxide powder and adding a predetermined amount of pure water thereto was filled into a three-dimensional metal core, dried and then subjected to pressure molding so as to form two pieces of split positive electrodes 43a obtained by vertically splitting a hollow cylindrical body with an internal diameter of about 2 mm and a thickness of about 0.87 mm, and two pieces of split positive electrodes 43b obtained by vertically splitting a hollow cylindrical body with an internal diameter of about 5.07 mm and a thickness of about 0.87 mm. Meanwhile, a paste composed mainly of a hydrogen storage alloy powder was applied to a two-dimensional metal core, dried and then subjected to pressure molding so as to form a negative electrode plate 44a with a length of about 12.47 mm and a thickness of about 0.43 mm and a negative electrode plate 44b with a length of about 22.07 mm and a thickness of about 0.43 mm. As a separator 42, a piece of long band-like separator was prepared.

Figure 4:
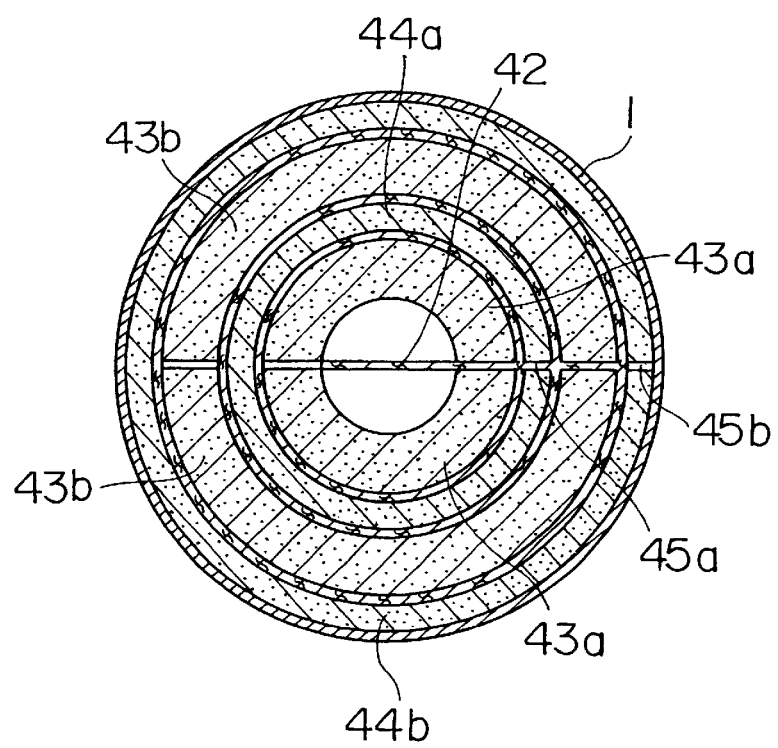
FIG. 4 is a transverse cross section of a battery according to yet another example of the present invention.
Figure 5:
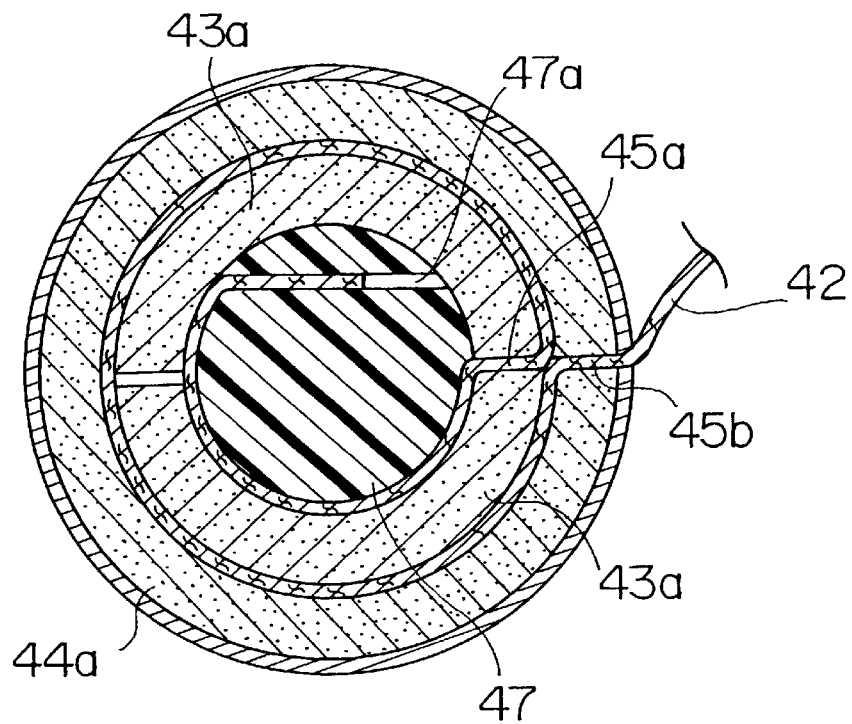
FIG. 5 is an enlarged transverse cross section of an assembly stage of an electrode group of the battery shown in FIG. 4.

The positive electrodes 43a and 43b had a structure having a metal core material section which was not filled with an active material at their upper part. On the other hand, the negative electrode plates 44a and 44b had a structure having a metal core material section which was not filled with an active material at their lower part. FIG. 5 is a transverse cross section in an intermediate stage of constructing an electrode group by the use of the above-described positive electrodes, negative electrodes and separator. In this figure, for easier understanding, the electrode section is enlarged, and therefore the sizes may not accord with those shown in FIG. 4.

47 represents a columnar core having a slit 47a in an axial direction. A end of the separator 42 is inserted into the slit 47a of this core 47, and the positive electrodes 43a are arranged on the periphery of the core. At this time, the separator 42 is drawn out of the electrodes 43a from one of clearances 45a formed between the positive electrodes 43a and wound only one turn on the outer side of the electrodes 43a. Next, the negative electrode plate 44a is wound on the outer side of the wound separator. Hence, the negative electrode plate 44a wound in a cylindrical form is arranged on the outer side of the separator. Then, the separator is drawn out of the negative electrode plate 44a from a clearance or slit 45b formed between the ends of this negative electrode plate.

In this manner, there is provided an electrode group comprising a hollow cylindrical positive electrode formed by the split positive electrodes 43a, the cylindrically wound negative electrode plate 44a, a cylindrical positive electrode formed by the split positive electrodes 43b and the cylindrically wound negative electrode plate 44b, arranged in the form of concentric circles so that the hollow cylindrical positive electrode is located in the center, in which the positive electrodes and negative electrodes are separated from each other by a piece of separator. After assembly of the electrode group, the core is removed from the electrode group. According to this method, it is possible to provide an electrode group which hits positive and negative electrodes completely separated from each other by a separator and is free from short-circuiting, without causing the separator to be caught in the electrode.

The exposed portions of the metal core material in the upper part of the above-mentioned positive electrodes 43a and 43b were electrically connected and the exposed portions of the metal core material in the lower part of the negative electrode plates 44a and 44b were electrically connected, respectively, by welding using a disk-shaped metal piece. This electrode group was inserted into a metal case of AAAA size and, after injecting an electrolyte a seal plate provided with a safety vent and the positive electrode were electrically connected and the metal case was sealed so as to assemble a battery of the present invention.

This battery was substantially the same as the battery C of Example 3 in the capacity at high-current discharge, injection time, etc. examined under the same conditions as those mentioned above. Moreover, since the positive and negative electrodes are perfectly separated from each other by the separator during the assembly of the electrode group, there is an advantageous effect that the defective rate of the electrode group can be reduced.

Industrial Applicability

As described above, according to the present invention, it is possible to obtain high-capacity sealed cylindrical nickel-metal hydride storage batteries superior in high-current discharge, without extending the injection time of the electrolyte in comparison with conventional batteries. Furthermore, it is possible to reduce defects during the assembly of the electrode group.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A method for producing a sealed cylindrical nickel-metal hydride storage battery comprising:

an electrode group;

a metal case for accommodating said electrode group; and a seal plate provided with a safety vent, for sealing an opening of said metal case, said electrode group being composed of at least one non-sintered type hollow cylindrical electrode of one polarity, at least one non-sintered type hollow cylindrical electrode of the other polarity, and a separator for separating these electrodes from each other, wherein said electrodes are arranged alternately in the form of concentric circles with the separator interposed therebetween so that the electrode of the one polarity is located in the center; and wherein each of said electrodes is constructed in a configuration comprising vertically split bodies or a slit in a vertical direction, one piece of continuing separator separates the electrode of one polarity from the electrode of the other polarity, and the separator which is wound only one turn to cover an outer side of the inner electrode goes through a clearance between the split bodies or the slit of the outer electrode and is connected to its portion covering an outer side of said outer electrode;

the method comprising the steps of:

(a) preparing electrodes having a configuration comprising vertically split bodies or a slit in a vertical direction, one piece of long separator, and a core;

(b) arranging the electrode of one polarity around the core holding an end of the separator, drawing the separator out of said electrode of one polarity from a clearance between the split bodies or the slit of said electrode and winding the separator only one turn on an outer side of said electrode;

(c) arranging the electrode of the other polarity on an outer side of said wound separator, drawing a remaining portion of said separator out of said electrode of the other polarity from a clearance between the split bodies or the slit of said electrode and winding said separator on an outer side of said electrode;

(d) repeating the step (c) until the number of remaining electrode is 1; and (e) arranging the remaining electrode on an outer side of an outermost turn of said wound separator.

2. The method according to claim 1, wherein step (a) comprises preparing the electrodes by (i) pressure molding a powder composed mainly of an active material; or (ii) applying or filling the powder composed mainly of an active material to a two-dimensional or three-dimensional metal core and subjecting it to pressure molding.

3. The method according to claim 1, wherein at least one of the hollow cylindrical electrodes is constructed from an electrode body prepared by bending a sheet-like electrode plate into a cylindrical shape, or by winding an electrode plate in a spiral form.

4. The method according to claim 1, wherein at least one of the hollow cylindrical electrodes is constructed from an electrode body prepared by bending two or more pieces of layered sheet-like electrode plates of the same polarity into a cylindrical shape, or by winding the two or more pieces of layered electrode plates of the same polarity in a spiral form.

5. The method according to claim 1, wherein the electrode group contains at least two non-sintered type hollow cylindrical electrodes of one polarity or the other polarity, and wherein the electrodes of the same polarity are electrically connected to each other.

6. The method according to claim 1, wherein the separator is obtained by winding a band-like separator one turn in a cylindrical shape and thermally welding the wound separator.

* * * * *